United States Patent [19]

Schmall et al.

[11] 4,375,289

[45] Mar. 1, 1983

[54] APPARATUS FOR MONITORING A BOUNDARY LINE

[75] Inventors: Karl-Heinz Schmall, Baden-Baden; Piotr Sendor, Frankfurt am Main, both of Fed. Rep. of Germany

[73] Assignee: PRECITEC Gesellschaft fur Präzisionstechnik und Elektronik mbH & Co. Entwicklungs und Vertriebs-KG, Baden-Baden, Fed. Rep. of Germany

[21] Appl. No.: 174,936

[22] Filed: Aug. 4, 1980

Related U.S. Application Data

[63] Continuation of Ser. No. 926,203, Jul. 19, 1978, abandoned.

[30] Foreign Application Priority Data

Jul. 19, 1977 [DE] Fed. Rep. of Germany ....... 2732543

[51] Int. Cl.³ .................. A63B 63/00; G08B 13/24
[52] U.S. Cl. ............................. 273/371; 273/127 R; 273/411; 273/29 R; 340/552; 340/572
[58] Field of Search ............ 273/371, 411, 1 B, 29 R, 273/31, 127 R, 58 G; 340/323, 552, 561, 562, 564, 565, 567, 572

[56] References Cited

U.S. PATENT DOCUMENTS

| 3,447,804 | 6/1969 | Cornell | 273/54 R |
| 3,696,379 | 10/1972 | Minasy | 340/572 |
| 3,727,208 | 4/1973 | Anderson et al. | 340/562 |
| 3,774,194 | 11/1973 | Jokay et al. | 273/31 X |
| 3,782,730 | 1/1974 | Horehler | 273/213 |
| 3,810,148 | 5/1974 | Karsten | 340/323 |
| 3,919,704 | 11/1975 | Williams et al. | 340/572 |
| 4,134,538 | 1/1979 | Lagarde et al. | 340/572 X |

FOREIGN PATENT DOCUMENTS

| 258258 | 12/1962 | Australia | 273/371 |
| 1370332 | 10/1974 | United Kingdom | 273/31 |

Primary Examiner—Anton O. Oechsle
Attorney, Agent, or Firm—William R. Hinds

[57] ABSTRACT

Apparatus for registering a chance event, particularly the passage of a ball over a closed boundary line in a game, is described wherein the ball contains an oscillatory circuit. Two parallel conductors, fed by an a.c. generator in phase opposition extend along the boundary line so that a receiving conductor extending between the transmitting conductors is subject to a resultant zero voltage until the ball approaches and passes the boundary line so disturbing the electromagnetic fields radiated by the transmitting conductors. The receiving conductor current then passes through an amplifier, phase comparison means, a pulse generator and display device. The phase comparison means is connected to distinguish the direction in which the ball crosses the line and also enables a zero setting device to accommodate prolonged extraneous signals. A compensating antenna and circuit eliminate stray field effects. The transmitting and receiving conductors can encircle a goal structure.

1 Claim, 5 Drawing Figures

APPARATUS FOR MONITORING A BOUNDARY LINE

This is a continuation of application Ser. No. 926,203 filed July 19, 1978, abandoned.

FIELD OF THE INVENTION

The invention relates to apparatus for registering a chance event and particularly to apparatus for monitoring a boundary area which is marked out in a space by a boundary line, in respect of objects which cross the boundary line.

Monitoring boundary lines gives rise to difficulties particularly when various objects pass across the boundary line, but of such objects only a given object which is to be identified accordingly is to be selectively singled out and registered.

Such problems arise in a very wide range of circumstance in respect of monitoring and control devices, and also for example in ball games, where it would be desirable precisely to register and indicate when the ball has crossed the goal line. All known optical or also electromagnetic monitoring devices are of no use in this case however, as the boundary line or goal line is crossed not only by the ball but also by the players, in which case it will be seen that erroneous indication would be inevitable.

DESCRIPTION OF THE PRIOR ART

British patent specification No. 1,370,332 already discloses a monitoring device which, for the purposes of monitoring a boundary line for objects crossing thereover, proposes the arrangement of transmitter coils and receiver coils which are coupled by an oscillatory circuit provided in the shoe of a player. It will be seen that this arrangement can only be used when the oscillatory circuit is positioned in space at a predetermined distance from the two coils. It is not possible to monitor the area over a boundary line, for example for oscillatory circuits which are moved past in the air at a spacing from the boundary line, for the simple reason that, if the sensitivity of the arrangement is increased to register objects which are moved past at a spacing above the coils, then the same induction values would occur when the oscillatory circuits approach the boundary line from the side, even before reaching the boundary line, as would occur when the circuits pass in space over the coils. Accordingly, signals would be produced in an approximately elliptical region around the coils.

However, it is not possible to monitor areas over a boundary line by the known arrangement. Other known monitoring devices can also be used only for monitoring for the approach of an object or location of an object, but not for monitoring a precisely defined area in space.

SUMMARY OF THE INVENTION

The invention is accordingly based on the problem of providing apparatus for monitoring an area in space defined by a boundary line, which apparatus is on the one hand capable of registering selectively predetermined objects and on the other hand is also simple and reliable in construction and cheap to produce.

According to the invention, this problem is primarily solved in that at least two approximately linear transmitting means emitting electromagnetic waves are provided along the boundary line, that the object is provided with a means for influencing the electromagnetic fields of the transmitting means, that at least one receiving means for receiving the electromagnetic waves radiated by the object is arranged along the boundary line, wherein the polarity of the electromagnetic waves of the radiating means is opposite to that of the receiving means, and that the radiation power of the electromagnetic waves of the radiation means and the spatial arrangement relative to the receiving means is such that the electromagnetic fields compensate each other in the receiving means provided that there is no influence exerted by the means provided on the object, and that the receiving means is connected to an amplifier and display means for delivering a display signal when the object crosses the boundary line.

It will be seen that with this arrangement according to the invention, irrespective of the distance from the receiving line at which the object is moved therepast, the signal display means can be actuated only when the object passes through the area over the receiving line. Power or radiation fluctuations do not result in any errors, as it is not the amplitude of the received signal but the passage through zero thereof which is used as the determining criterion. Irrespective of field strength and interference signals however, this passage through zero occurs only when the object is so positioned in space that the original balanced condition is re-established. It will be seen that this is achieved only when the object is in the region where the influencing action by the two transmitting lines is of equal magnitude. This region is geometrically clearly determined and represents the position which is above or below the line defined by the receiving line.

This arrangement also ensures that the receiving means receives signals only when the predetermined object crosses over the boundary line, while other metal or non-metal objects cannot cause any interference signals.

The invention may be embodied in a particularly reliable manner if at least two transmitting means are arranged at a spacing from and parallel to each other, and the receiving means extends between the transmitting means.

The invention advantageously also provides in particular that signals of different polarity sequence are induced in the receiving line, depending on the side from which the object crosses the boundary line, so that, when appropriate signal processing is effected, it is also possible to determine and display the direction in which the object is moving.

The fields which are of opposite polarity relative to each other also establish a spatial limit at which the induction in the oscillatory circuit and the electromagnetic waves which the object induces in the receiving means change in respect of polarity.

The passage through zero of the signals, which may be readily determined by a differencing means or other known circuit arrangements, therefore indicates with absolute reliability and with a high degree of precision when the object has crossed the spatial limit.

Thus, when the apparatus is used for monitoring ball games, it is possible in particular to avoid erroneous indications which could be caused by a ball passing the boundary area from the wrong direction.

It is advantageous for a compensation means to be provided for zero adjustment of the receiving line so that the overall arrangement can be adapted to particular specific circumstances and also to any interference signals which may be present.

The apparatus according to the invention may be embodied in a particularly simple manner if the transmitting means are transmitting lines which are connected in opposition to a high-frequency generator, and the receiving means is a receiving line which extends between the transmitting lines and which is connected to the input of an amplifying means for amplifying the induced signals.

For the purposes of suppressing a high interference level and/or for further increasing the degree of sensitivity of the apparatus, the invention further proposes that an additional receiving means may be provided at a spacing from and outside of the electromagnetic field of the transmitting lines, for receiving electromagnetic interference fields, and that the signals produced by the additional receiving means are coupled in a differential amplifier to the signals received by the receiving means, in such a way that all interference signals are suppressed.

Any faulty indication due to interference induction effects from the transmitting lines in the receiving line is also avoided in a particularly reliable manner if the radiating means on the object is tuned to a different frequency from the transmitting frequency of the transmitting means. This may be embodied in a particularly simple manner if the power of the transmitting lines, which is received by the oscillatory circuit at the object, is either transmitted to a second oscillatory circuit of different frequency, or is used for actuating a transmitter of a different frequency.

It will be seen in this case that any direct coupling from the transmitting lines to the receiving lines is ineffective, if the receiving means is also tuned to the different frequency of the radiating means of the object.

A particularly high level of measuring sensitivity may be achieved if an active transmitter is provided at the object, such transmitter being activated when the object crosses the boundary line. A construction of this nature may be produced virtually in all cases, with the miniature components which are obtainable nowadays.

The degree of protection enjoyed by the apparatus from interference fields may be further improved if transmitting and/or receiving means are provided, at the side remote from the boundary line, with a screening means, for example of soft iron or also aluminum, for static screening.

In the case of objects which occupy a greater amount of space, for example a ball, it is desirable to provide a plurality of oscillatory circuit coils in order to be able to ascertain definitely when the object has crossed the boundary line. In such an arrangement, preferably three oscillatory circuit coils are arranged relative to each other in space and at an angle of 90° and are electrically connected in series in order to provide a symmetrical simple construction and to ensure that the signal is produced in a clearly defined and reliable manner.

It will be seen that the arrangement is to be adapted in each case to the specific circumstances; for example, when the apparatus is used for ice hockey with a relatively small puck, it is desirable to use an arrangement which is spatially different from the arrangement used in football where the ball is of greater size and where the oscillatory circuit may be provided preferably between the rubber bladder and the outside casing of the ball.

Particularly reliable frequency characteristics and a high degree of efficiency may be achieved if the oscillatory circuit at the object is in the form of a piezo and/or magnetostrictive oscillator.

It will be seen that the inventive content and the technical advance of the subject of this application are provided both by the novel individual features and also in particular by the combination and subcombination of any features employed in the invention.

DESCRIPTION OF THE DRAWINGS

Embodiments of the invention are described in greater detail hereinafter with reference to the drawings, in which:

As shown in FIG. 1, a transmitting line 1 which is in the form of a current loop circuit is supplied with alternating-current voltage in phase opposition relative to a transmitting line 2, by means of a high-frequency generator 5. The transmitting lines 1 and 2 extend parallel to a receiving line 3 which defines a boundary area which is to be monitored to ascertain whether it is cut by a ball 19. As long as the ball 19 is outside of the region of the transmitting lines 1 and 2, or the receiving line 3, it will be seen that voltages of opposite polarity are induced in the receiving line 3 by the transmitting line 1 and the transmitting line 2 respectively, so that no signal is applied to the input of an amplifier 7 to which the receiving line 3 is connected. As shown, for the purposes of setting this zero position, a compensation means 6 is connected between the generator 5 and the lines 1 and 2.

As shown in FIG. 1, provided in the ball 19 is an oscillatory circuit 4 which is tuned to the frequency of the generator 5. Therefore, as soon as the ball 19 is between the transmitting line 2 and the receiving line 3, the oscillatory circuit is excited by the electromagnetic field of the transmitting line 2, and in turn delivers an alternating-current voltage to the receiving line 3.

Figure 1:
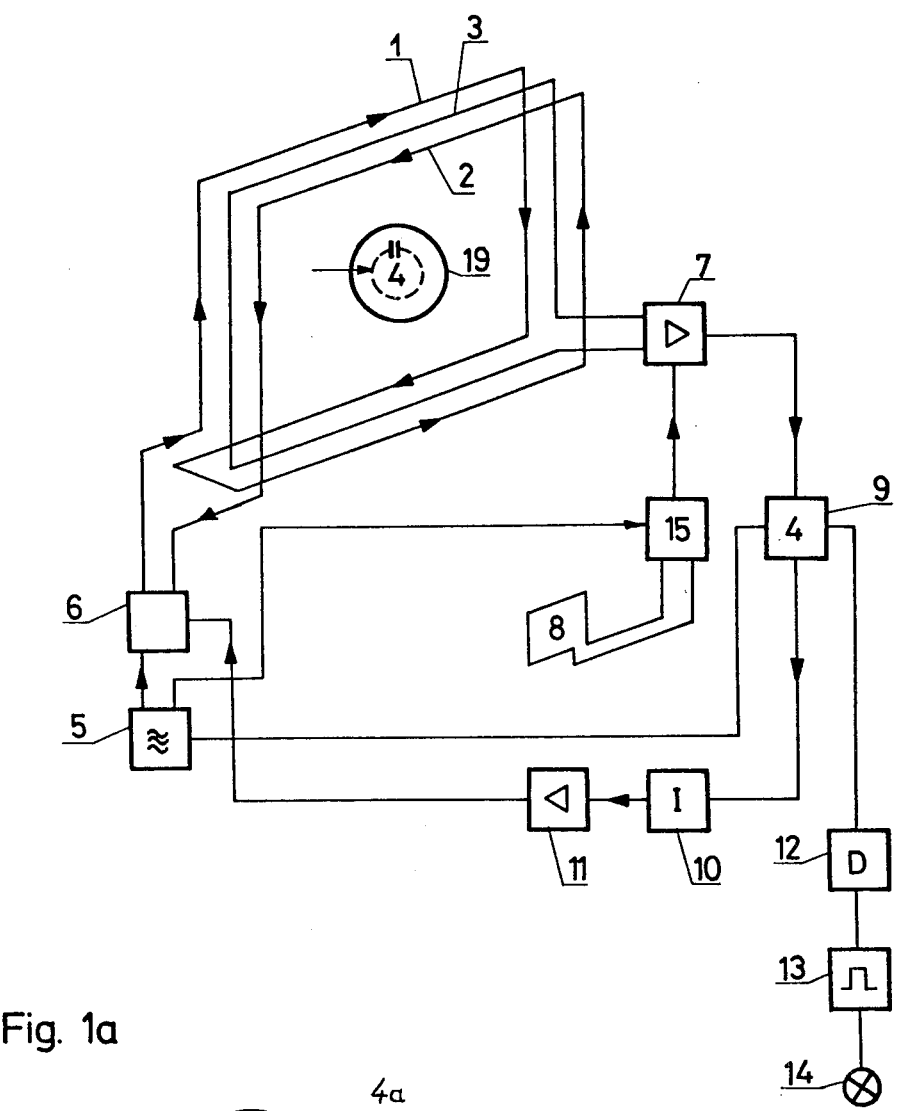
FIG. 1 is a diagrammatic view of apparatus having the features according to the invention.

This amplified induction effect from the transmitting line 2 is not compensated by voltage from the transmitting line 1, so that a signal is applied to the amplifier 7. The minimum level in respect of power transmission always occurs when the oscillatory circuit 4 is precisely over the receiving line 3, while before and after that moment, there is an induction effect of opposite phase positions.

In order to compensate for extraneous and stray fields which act on the receiving line 3, the arrangement has a compensation antenna 8 which is arraged in space behind the goal (not shown) which is defined by the receiving line 3. The compensation antenna is connected by way of a compensation circuit 15 to the amplifier 7 and is so coupled opposite to the signals delivered by the receiving line 3 that only the differential voltages which are produced when the ball passes through the boundary field are amplified.

In order to compensate for any possibly remaining residual asymmetry in the two opposed fields of the transmitting line 1 and the transmitting line 2 in the compensation antenna 8, an additional voltage is tapped off from the generator 5 and applied to the compensation circuit 15. The compensation circuit is so constructed, in known manner, that amplitude and phase of the compensation voltage are adjustable so that it is possible to provide for complete compensation.

The output of the amplifier 7 is connected to the input of a phase comparison means 9 and the generator 5 is connected to a second input of the phase comparison means. The phase comparison means is constructed in known manner and the phase position is so adjusted that a signal appears at the output of the phase comparison means 9 only when the signal produced by the amplifier 7 corresponds in its phase position to the transmitting line 2. However, as soon as the amplifier 7 applies to the phase comparison means 9 a signal with the opposite phase position of the transmitting line 1, the output of the phase comparison means 9 is blocked so that the production of a signal is restricted, with an absolute degree of reliability, to cases in which the ball 19 passes into the open goal opening from the outside and crosses the boundary line.

As shown, an output of the phase comparison means 9 is connected to an integrating means 10 which transmits a setting signal by way of an amplifier 11 to the compensation means 6. In this arrangement the integrating means 10 is so designed that rapid changes in signal, as occur when the ball flies into the goal area, do not cause any output voltage. However, as soon as the phase comparison means 9 delivers a continuous signal, for example because of uncompensated extraneous fields or in the event of ageing of components or as a result of temperature influences, this causes a setting signal to be applied to the compensation means 6, and this signal is delivered until the sending and transmitting lines 1, 2 and 3 respectively return to the zero compensation position.

The second output of the phase comparison means 9 on the other hand is connected to a threshold value switch 12 which is in the form of an integrating means, in known manner. As soon as the transmitting line 2 is coupled to the receiving line 3 by the oscillatory circuit 4 of a ball 19, thereupon a rapidly rising output signal is applied by the phase comparison means 9 to integrating means 10 and threshold value switch 12 which, when the maximum value is exceeded, actuate a monostable pulse generator 13. This in turn actuates a display means 14 which optically indicates that the ball 19 has crossed the boundary line.

Figure 1A:
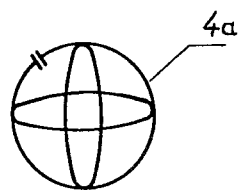
FIGS. 1a and 2 show a modified embodiment with a radiating means as shown in FIG. 1.

FIG. 1 shows the oscillatory circuit 4 in a diagrammatic form, as a single coil winding combined with a capacitor. For the purposes of increasing the degree of measuring precision, as shown in FIG. 1a there may be three coil arrangements which are connected in series and which are each arranged at an angle of 90° to each other. In this way it is possible to ensure that the transmitting line 2 and the receiving line 3 are uniformly coupled, irrespective of the position of the ball 19 or the oscillatory circuit 4a.

It will be appreciated that, according to the frequency and the transmitting power of the generator 4, the oscillatory circuit 4a may have only one winding or a plurality of windings, to form the inductance.

If, as in the embodiment illustrated, the oscillatory circuit 4 is arranged in a ball 19, it is advantageous for the winding or windings of the coil of the oscillatory circuit to be disposed between the casing of the ball and the ball bladder, or in the surface of the ball bladder. In such a case, the oscillatory circuit capacitance may be disposed in the form of a discrete component, in a suitable manner, within the ball. Adapting the arrangement to the different possible uses, both in regard to the oscillatory circuit 4 and also as regards the design and arrangement of the whole apparatus is a matter which will be familiar to the man skilled in the art, and is therefore not described in greater detail herein.

Figure 2:
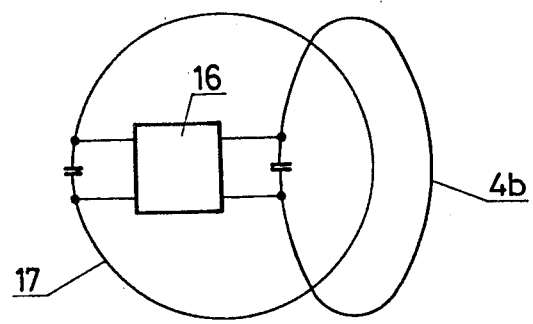

FIG. 2 shows a modified embodiment of the invention, which has an oscillatory circuit 4b in which the transmitting power of the transmitting lines 1 and 2 is induced. The alternating-current voltage signals which are thus produced are applied to the input of an amplifier 16 whose output is connected to a radiating means 17 which is in the form of an oscillatory circuit which may comprise a piezo and/or magnetostructive oscillator and an L-C circuit. The oscillatory circuit 17 in this case is tuned to a multiple of the frequency of the oscillatory circuit 4b. Accordingly, when this arrangement is used, the receiving line 3 or the amplifier 7 is also to be tuned to this said higher frequency. In this way it is possible to provide that no direct coupling or self-excitation may occur between the transmitting lines 1 and 2 and the receiving line 3, as the higher frequency of the receiving line 3 is produced only when the ball 19 passes over the boundary line.

The voltage which thus appears at the amplifier 7 is distinguished by a particularly sharp passage through zero, when phase reversal occurs. This permits particularly accurate signalling, and in addition makes it possible to achieve a particularly good signal-noise ratio, by means of the amplifier 16. The amplifier 16 itself, and also a suitable current source, are obtainable in miniaturised form from a very wide range of manufacturers and in a very wide range of forms, so that no technical problems occur even with the small amount of space to be occupied by this arrangement.

Figure 3:
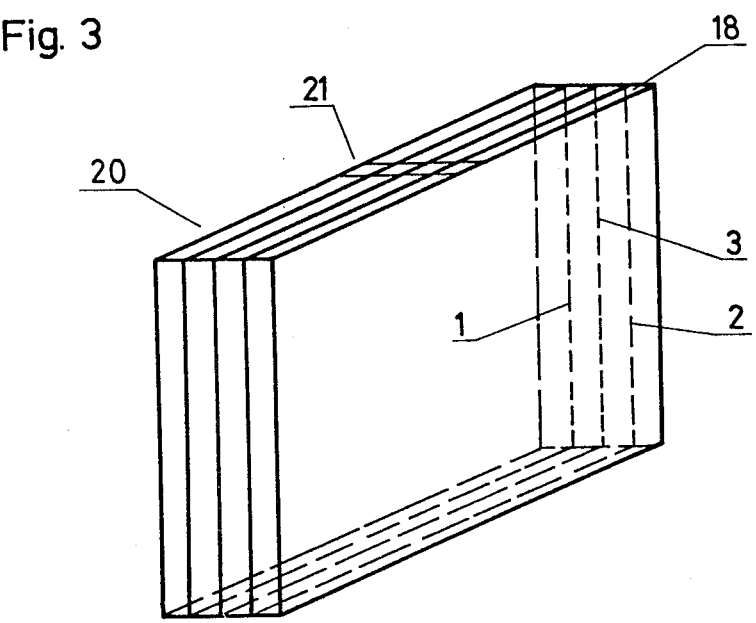
FIG. 3 shows a screening means for the transmitting and receiving means of FIG. 1 and, FIG. 4 is a diagrammatic representation of the field configuration when the object is in different positions over the transmitting lines.

FIG. 3 diagrammatically shows a goal structure 20 in which the transmitting lines 1 and 2 and the receiving line 3 are incorporated. In order to screen out external extraneous fields and also to prevent induction in the receiving line 3 by a ball which passes the goal on the outside, there is a magnetic outer screening means 18 which may be of soft iron or aluminum and which short-circuits the outer magnetic field components of the receiving line 3 and the transmitting lines 1 and 2 respectively.

This screening means is in the form of an interrupted loop (at 21) so that the transmitting and receiving lines 1 to 3 are not magnetically short-circuited.

Figure 4:
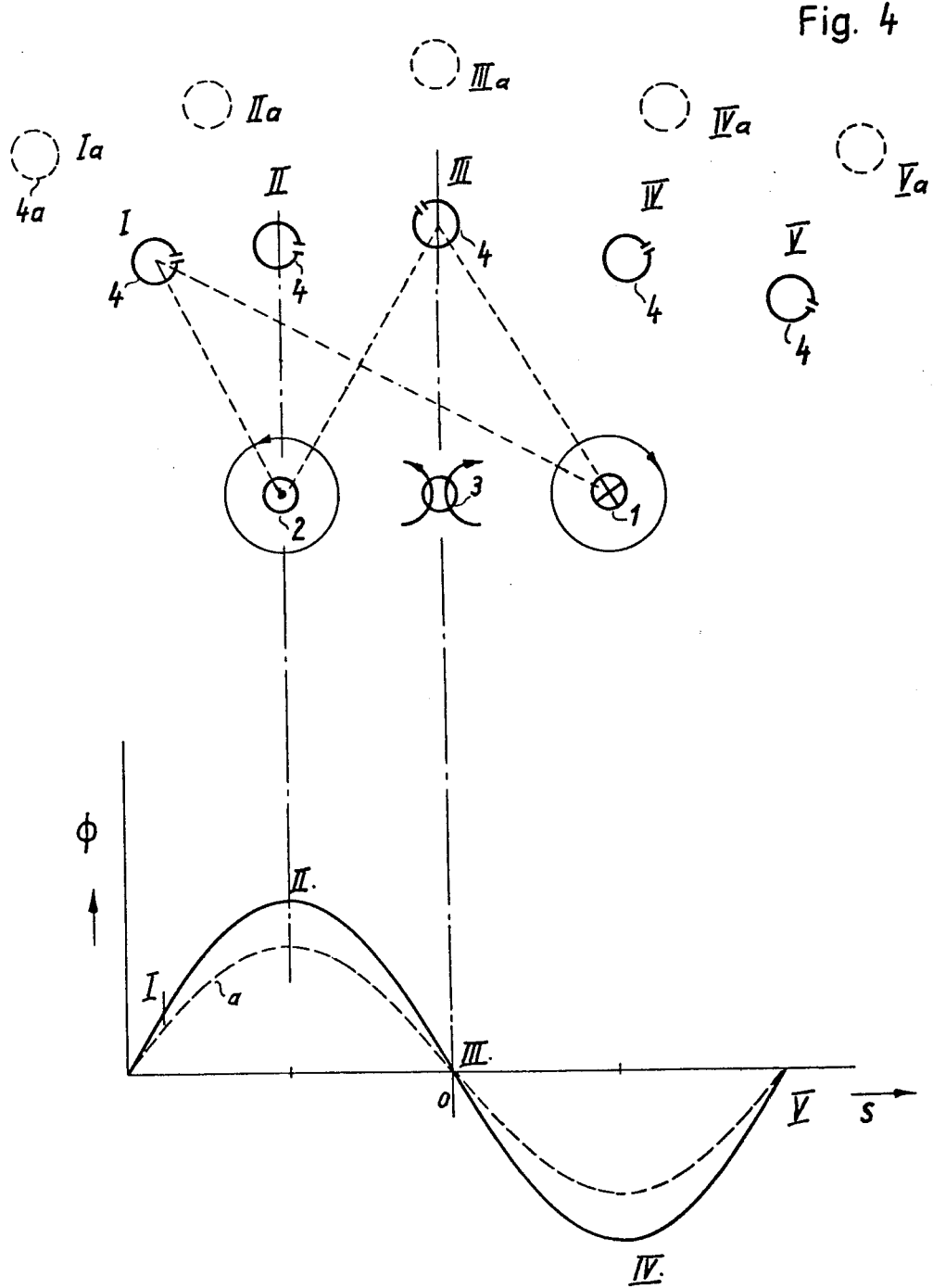

FIG. 4 diagrammatically shows the field configuration around the transmitting lines 1 and 2 and in the receiving line 3. As shown, the alternating fields which are radiated by the transmitting lines 1 and 2 are oppositely directed in such a way that the induction currents in the receiving line 3 cancel each other out. As soon as an oscillatory circuit 4 on an object approaches, the equilibrium condition in the receiving line 3 is destroyed by additional induction by the oscillatory circuit 4. Thus, in position I, the field radiated by the transmitting line 2 begins to excite the oscillatory circuit 4, so that corresponding secondary power is induced in the receiving line 3, which can readily be associated with the transmitting line 2 by phase comparison. At about position II, maximum induction by the transmitting line 2 is then attained. Position III represents the 'neutral' plane vertically above the receiving line 3, in which the fields from the transmitting line 1 and the transmitting line 2 compensate for each other. Accordingly, no current is induced in the receiving line 3, and this 'passage through zero' may be accurately determined by measurement means.

At approximately position IV, the oscillatory circuit 4 is at a maximum comparable to position II, although in this position this maximum is to be attributed, in regard to phase, to the transmitting line 1. In position V the field decreases again.

FIG. 4 shows in broken line the same sequence, with an oscillatory circuit 4a at a greater distance from the receiving line 3. In fact, in this case, the field configuration (curve a) is of lower amplitude, but the passage through zero at position III is still clearly defined. Accordingly, irrespective of the distance of the oscillatory circuit 4 from the receiving line 3, the passage through zero of the induction currents induced in the receiving line 3 is to be reliably observed in each case perpendicularly over the receiving line 3, by virtue of compensation of the fields of the two transmitting lines 1 and 2.

From the point of view of measurement procedure, the passage through zero may be determined in a particularly simple manner by differentiation of the signal tapped off from the receiving line 3. This arrangement is quite particularly independent of interference, as for example a reduction in the emission power in the transmitting line 1 and 2 results in a uniform reduction in the fields, without the passage through zero being influenced thereby.

If the monitoring action is to be restricted to objects which move past the transmitting lines 1 and 2 when coming from a predetermined direction, phase determination may be used to establish which one of the two transmitting lines 1 and 2 triggered the first maximum, and the signal evaluation operation may either be suppressed or permitted, in dependence on the phase determination result.

It is readily apparent to the man skilled in the art that all the above-described processes and operations may be readily performed with commercially available circuits and components so that circuit details are not described herein. Obviously, instead of the coupling action by means of the oscillatory circuit, it is also possible to provide a damping action. In that case, in position I this would result in a weakening of the field of the transmitting line 2, so that the field of the transmitting line 1 would dominate in the receiving line 3. In operation, this arrangement would result in a field configuration which is reversed relative to that shown in FIG. 4. In this case also however the passage through zero can be clearly defined at position III, so that this arrangement can be put to the same uses.

We claim:

1. Apparatus for registering a chance event, comprising an object to be projected randomly over a boundary line, and means for monitoring a boundary line marking out an area in space and detecting the random passage of said object over the boundary line, said monitoring means comprising at least two approximately linear transmitting conductors provided along said boundary line for emitting electromagnetic fields of opposite polarity, electrical supply means for supplying alternating voltage in phase opposition respectively to said conductors so as to produce said fields, at least one first receiving means arranged for voltages to be generated therein by said electromagnetic fields and located so that said generated voltages normally counteract one another, an amplifier connected to said first receiving means, indicator means connected to said amplifier, said objects including means for influencing said electromagnetic fields of said transmitting conductors when passing over said boundary line thereby disturbing said counteracting voltages in said first receiving means and causing a signal to appear at said indicator means to indicate passage of said object over said boundary line, said monitoring means further comprising at least one second receiving means spaced from and outside of said electromagnetic fields of opposite polarity but arranged to receive interference signals generated by electromagnetic transmitting sources other than the said linear transmitting conductors and said means included in the object, which interference signals are also received by said first receiving means and passed to said amplifier, said second receiving means being connected to said amplifier by way of compensation means for converting interference signals received by said second receiving means and feeding to said amplifier oppositely coupled signals relative to interference signals from said first receiving means so that interference signals received by said first and second receiving means are effectively compensated and suppressed.

* * * * *